(12) United States Patent
Schroeder et al.

(10) Patent No.: US 11,643,186 B2
(45) Date of Patent: May 9, 2023

(54) DUCT FOR DUCTED-ROTOR AIRCRAFT

(71) Applicant: Bell Textron Inc., Fort Worth, TX (US)

(72) Inventors: Karl Schroeder, Southlake, TX (US);
William Anthony Amante, Grapevine, TX (US); Joseph Richard Carpenter, Jr., Kennedale, TX (US); Christopher Marion Johnson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 541 days.

(21) Appl. No.: 16/679,121

(22) Filed: Nov. 8, 2019

(65) Prior Publication Data

US 2021/0139130 A1 May 13, 2021

(51) Int. Cl.
*B64D 27/26* (2006.01)
*B64C 11/00* (2006.01)
*B64C 11/46* (2006.01)
*B64C 11/02* (2006.01)
*B64C 29/00* (2006.01)

(52) U.S. Cl.
CPC ............ *B64C 11/001* (2013.01); *B64C 11/02* (2013.01); *B64C 11/46* (2013.01); *B64D 27/26* (2013.01); *B64C 29/0033* (2013.01); *B64D 2027/264* (2013.01)

(58) Field of Classification Search
CPC .............. B64D 27/26; B64D 2027/264; B64D 2027/262; B64C 11/001
See application file for complete search history.

(56) References Cited

U.S. PATENT DOCUMENTS

| | | | | |
|---|---|---|---|---|
| 2,473,329 A | * | 6/1949 | Candler | ................... B64C 27/82 244/17.21 |
| 7,815,145 B2 | * | 10/2010 | Beardsley | .............. B64D 27/26 244/54 |
| 8,905,719 B2 | * | 12/2014 | Kray | ....................... F01D 5/282 416/230 |

* cited by examiner

*Primary Examiner* — Brian M O'Hara
(74) *Attorney, Agent, or Firm* — Lightfoot & Alford PLLC (57) ABSTRACT

A duct for a ducted-rotor aircraft may include internal structural components such as a spindle that is supported by a fuselage of the aircraft, first and second annular spars that are attached to an end of the spindle, a central hub that supports a motor of the aircraft, a plurality of stators that extend from the central hub to the second spar, and a plurality of ribs that are attached to the first spar and the second spar at respective opposed ends. The spindle may include an attachment interface to which the first and second spars are attached. The attachment interface may be disposed at the second end of the spindle. The attachment interface may define first and second arc-shaped planar surfaces to which the first and second spars, respectively, are attached.

10 Claims, 14 Drawing Sheets

DUCT FOR DUCTED-ROTOR AIRCRAFT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Ducted-rotor aircraft have at least one ducted rotor for providing lift and propulsion forces. Each ducted rotor typically has internal structure that supports a motor of the aircraft, and an aerodynamic exterior skin. It is desirable to minimize the number of separate components that make up the internal structure, not only to limit the weight of the ducted rotor, but further to limit the number of joints that might be stressed during operation of the aircraft.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Internal structural components are disclosed herein for use in aircraft such as ducted-rotor aircraft.

Figure 1:
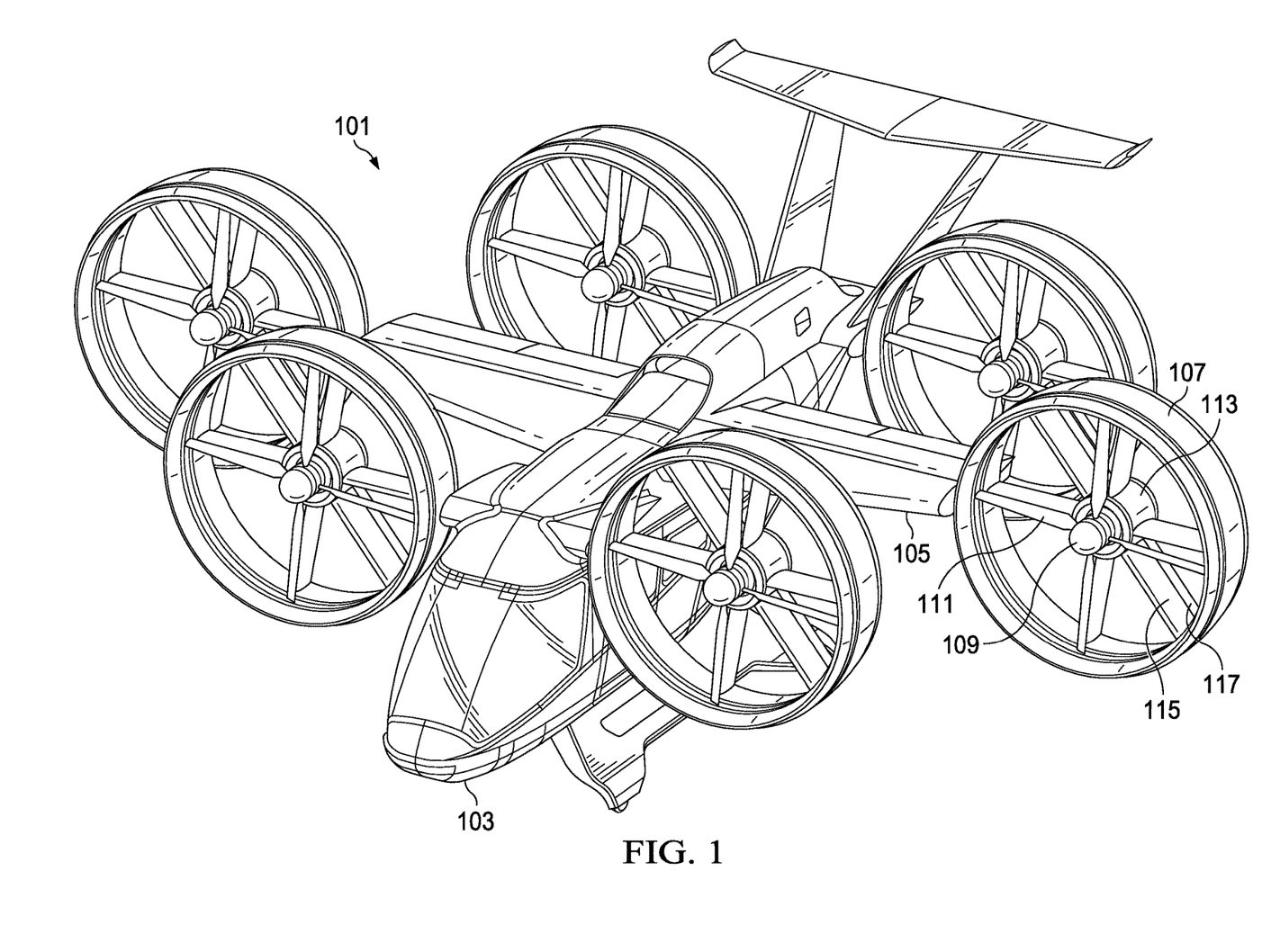
FIG. 1 is an oblique view of an aircraft with ducted rotors.

FIG. 1 is an oblique view of a ducted-rotor aircraft 101. Aircraft 101 comprises a fuselage 103 with a plurality of fixed wings 105 extending therefrom and a plurality of pivotable ducts 107. As shown, a duct 107 is located at an end of each wing 105. Each duct 107 houses a power plant for driving an attached rotor 109 in rotation. Each rotor 109 has a plurality of blades 111 configured to rotate within ducts 107.

The position of ducts 107, and optionally the pitch of blades 111, can be selectively controlled to control direction, thrust, and lift of rotors 109. For example, ducts 107 are repositionable to convert aircraft 101 between a helicopter mode and an airplane mode. As shown in FIG. 1, ducts 107 are positioned such that aircraft 101 is in airplane mode, which allows for high-speed forward-flight. Ducts 107 are repositionable to convert aircraft 101 into helicopter mode (not shown), which allows for vertical takeoff and landing, hovering, and low-speed directional movement.

Each duct 107 includes a central hub 113 that is configured to receive a rotor 109 and/or other components. Each duct 107 further includes a plurality of stators 115 that extend outwardly from the hub 113. Each duct 107 includes six stators 115 that extend radially outward from hub 113. As shown, stators 115 are unequally spaced about hub 113. It should be appreciated that duct 107 may be alternatively configured with more or fewer stators 115. It should further be appreciated that duct 107 may be alternatively configured with different spacing of stators 115 about hub 113. Duct 107 further includes vanes 117 that are pivotally attached to respective stators 115, such that vanes 117 may be rotated to facilitate changes of direction, turning, etc. during flight of aircraft 101.

Figure 2:
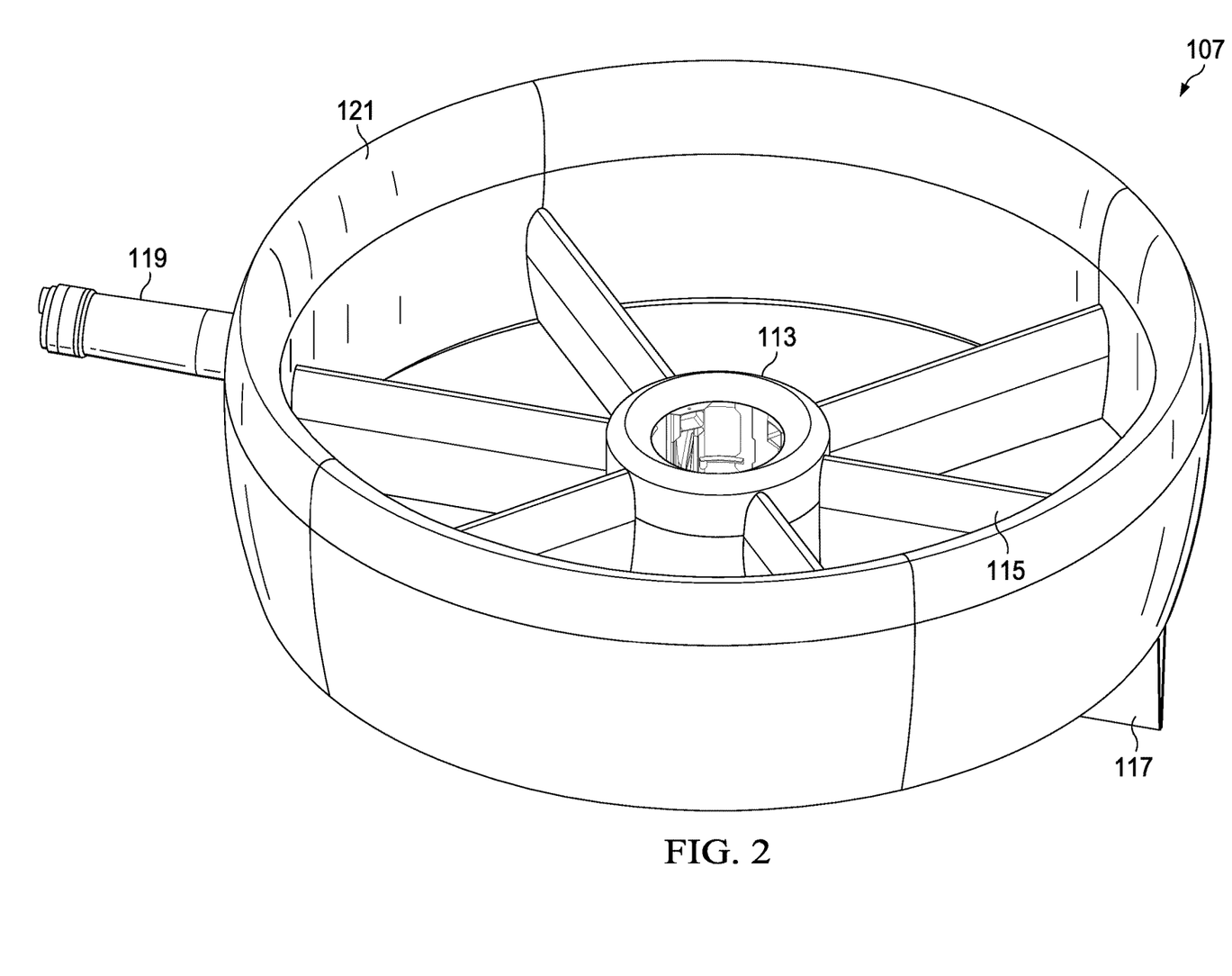
FIG. 2 is an oblique view of a duct of the aircraft depicted in FIG. 1.

FIG. 2 is an oblique view of a duct 107 of aircraft 101. Duct 107 is depicted in FIG. 2 without rotor 109. As shown, duct 107 includes a spindle 119 that extends outward from and that facilitates pivotable attachment of duct 107 to a corresponding wing 105 of aircraft 101. Duct 107 may include one or more sections of fairing 121 that form an aerodynamic outer skin of duct 107.

Figure 3:
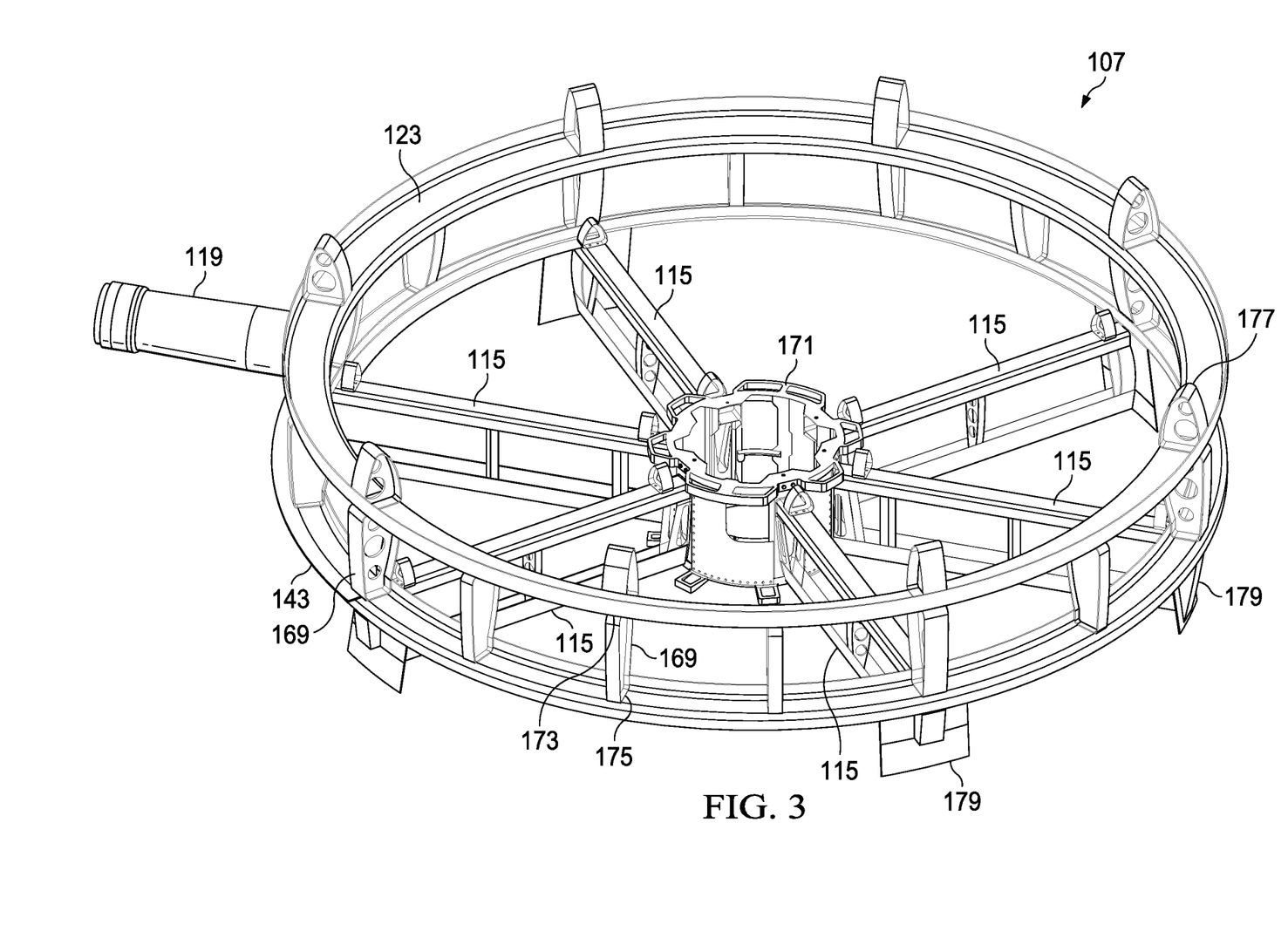
FIG. 3 is an oblique view of the duct depicted in FIG. 2, with an outer skin of the duct removed to illustrate internal components of the duct.

FIG. 3 is an oblique view of duct 107 with fairing 121 removed to illustrate inner components of duct 107. Included among structural members of duct 107 are stators 115, spindle 119, an annular forward spar 123, an annular aft spar 143, a plurality of ribs 169, and an inner hub assembly 171.

Each rib 169 defines an upper end 173 and an opposed lower end 175. The upper end 173 of each rib 169 is configured to attach to forward spar 123, and the lower end 175 of each rib 169 is configured to attach to aft spar 143. In this regard, ribs 169, when attached in place, extend between forward spar 123 and aft spar 143. As shown, ribs 169 may be configured with differing geometries. For example, respective ribs 169 positioned above the ends of stators 115 may be wider than the remaining ribs 169, and may define one or more apertures that extend therethrough. It should be appreciated that duct 107 is not limited to the illustrated configuration of ribs 169. For example, duct 107 may be implemented with more or fewer ribs and/or with ribs having the same or different geometries as compared to ribs 169. In this embodiment, each of the plurality of ribs 169 defines a curved outward-facing surface that is configured to facilitate attachment of a corresponding portion of fairing 121 to duct 107.

In this embodiment, the structural members of duct 107 further include braces 177 and stator brackets 179. Braces 177 are attached to forward spar 123, and are configured to support corresponding portions of fairing 121. As shown, braces 177 are spaced apart around forward spar 123, attached to forward spar 123 at locations above every other rib 169. Stator brackets 179 are attached to aft spar 143 at locations where stators 115 intersect aft spar 143. Stator brackets 179 are configured to facilitate attachment of respective ends of stators 115 to aft spar 143. As shown, stator brackets 179 may be configured with differing geometries. In this embodiment, each stator bracket 179 is fabricated as a single-piece component.

One or both of forward spar 123 and aft spar 143 may be constructed of composite material. In the instant disclosure, composite material preferably refers to plies of a fiber-reinforced plastic (FRP) composition that includes filament fibers, such as carbon fibers for example, embedded in a thermoset polymer matrix material such as a thermoplastic resin. Preferably the fibers within the plies are woven and the plies are pre-impregnated with resin. To illustrate, forward spar 123 and aft spar 143 may be constructed from one or more layered plies of carbon-fiber-reinforced plastic (CFRP). It should be appreciated that duct 107 is not limited to an implementation having two spars such as forward spar 123 and aft spar 143. For example, duct 107 may be alternatively implemented with more or fewer spars.

When ducts 107 are positioned as shown in FIG. 1 with the blades 111 of rotors 109 rotating, air will move into ducts 107 past forward spar 123 as rotors 109 generate thrust that causes aircraft 101 to move in a forward direction. As air moves through ducts 107 while the blades 111 of rotors 109 are rotating, the air will move past aft spar 143 and be exhausted away from ducts 107, for example in an aft direction as aircraft 101 moves in a forward direction.

Figure 4:
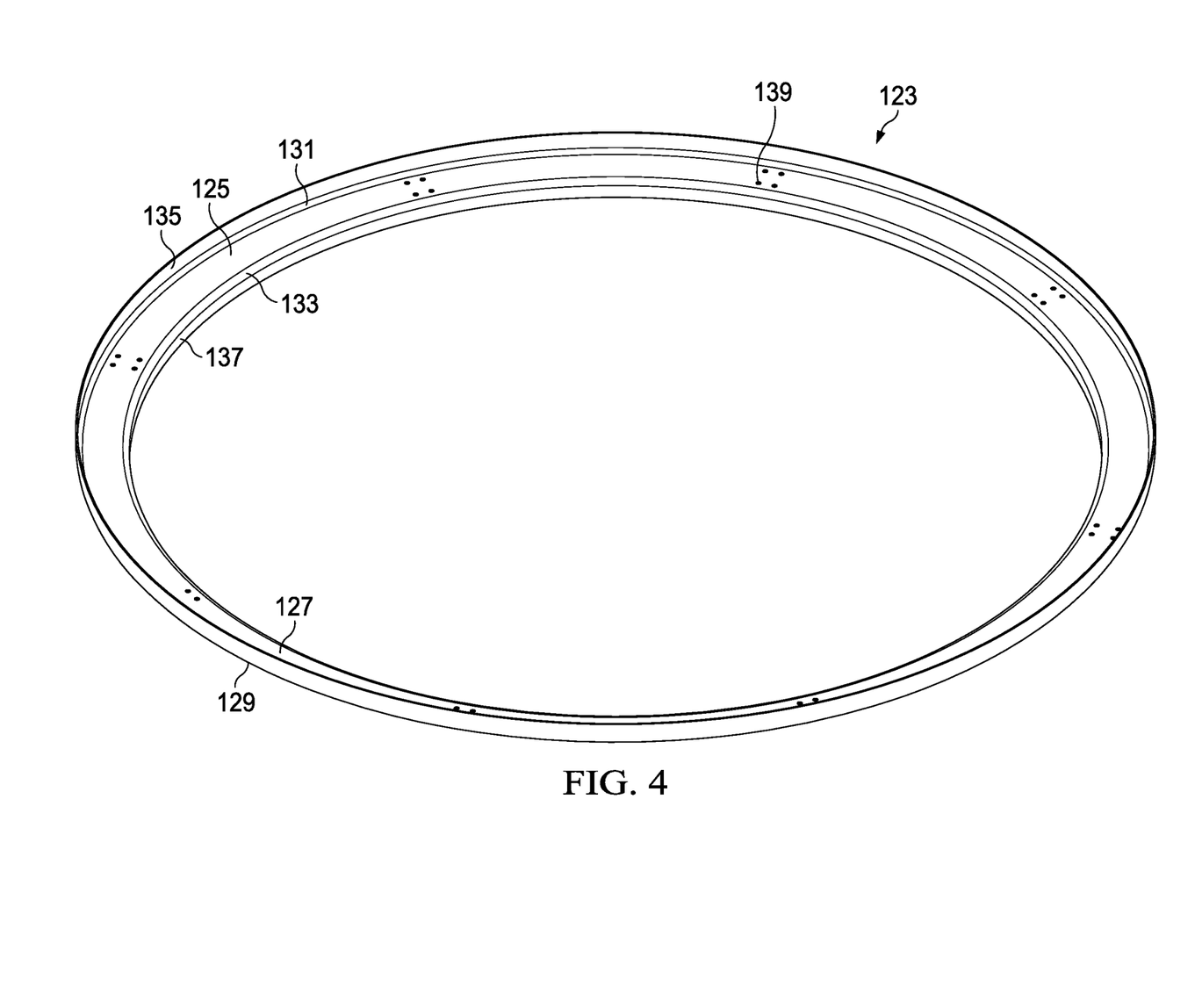
FIG. 4 is an oblique view of a forward spar component of the duct depicted in FIG. 3.

FIG. 4 is an oblique view of forward spar 123. In this embodiment, forward spar 123 includes an annular plate 125 that defines an upper surface 127 and an opposed lower surface 129. Plate 125 further defines a circumferential outer edge 131 and a circumferential inner edge 133. Forward spar 123 further includes a first circumferential flange 135 that extends away from upper surface 127 along outer edge 131 of plate 125. As shown, first circumferential flange 135 may be configured such that it tapers inwardly from outer edge 131 of plate 125. Forward spar 123 further includes a second circumferential flange 137 that extends away from lower surface 129 along inner edge 133 of plate 125. As shown, second circumferential flange 137 may be configured such that it tapers inwardly from inner edge 133 of plate 125. Forward spar 123 may be configured to facilitate attachment of one or more other components thereto, such as ribs 169 and braces 177. For example, as shown forward spar 123 defines a plurality of apertures 139 that extend through plate 125. Apertures 139 are configured to receive fasteners to secure ribs 169 and braces 177 to forward spar 123.

Figure 5:
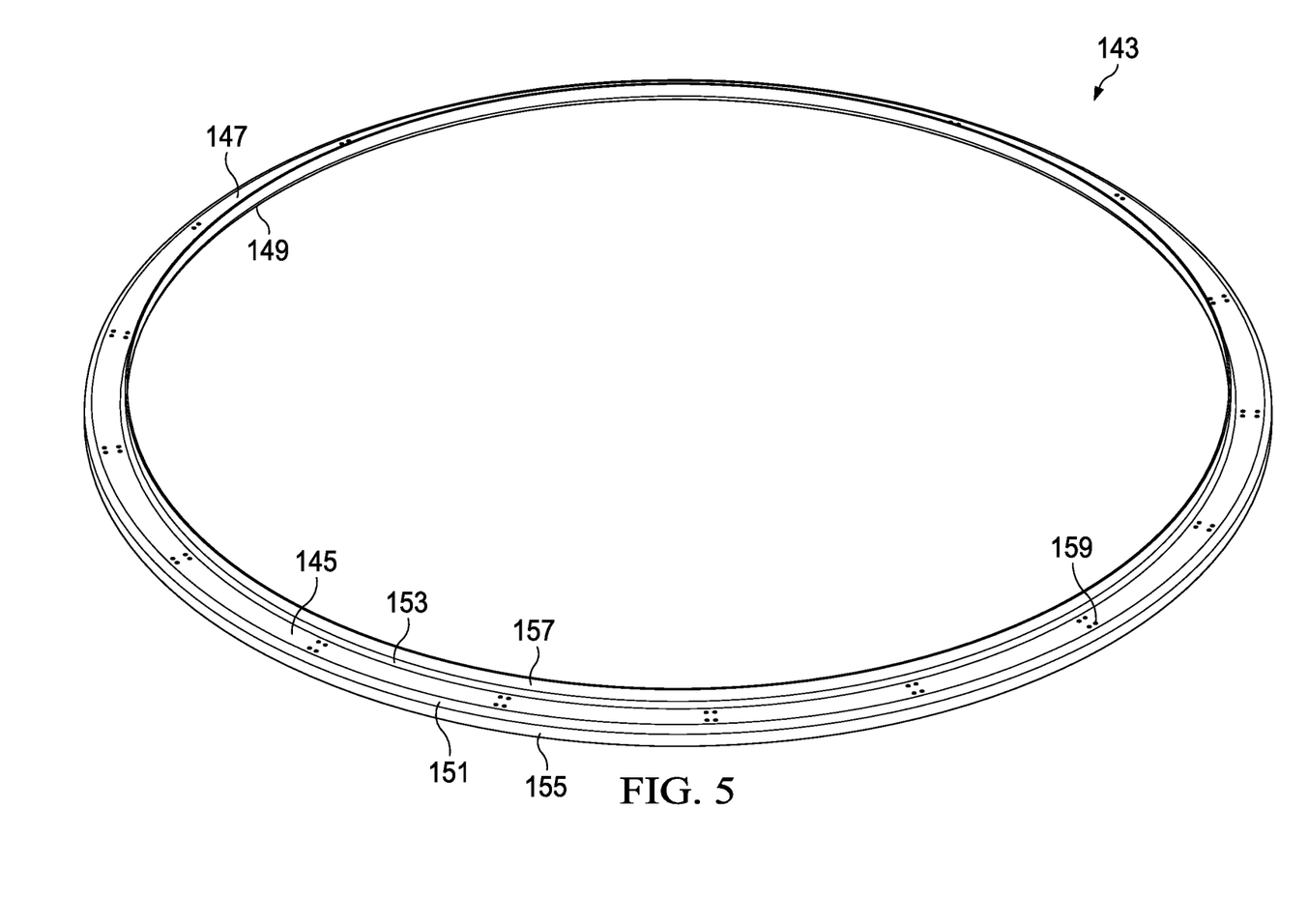
FIG. 5 is an oblique view of an aft spar component of the duct depicted in FIG. 3.

FIG. 5 is an oblique view of aft spar 143. In this embodiment, aft spar 143 includes an annular plate 145 that defines an upper surface 147 and an opposed lower surface 149. Plate 145 further defines a circumferential outer edge 151 and a circumferential inner edge 153. Aft spar 143 further includes a first circumferential flange 155 that extends away from lower surface 149 along outer edge 151 of plate 145. As shown, first circumferential flange 155 may be configured such that it tapers inwardly from outer edge 151 of plate 145. Aft spar 143 further includes a second circumferential flange 157 that extends away from upper surface 147 along inner edge 153 of plate 145. As shown, second circumferential flange 157 may be configured such that it tapers inwardly from inner edge 153 of plate 145. Aft spar 143 may be configured to facilitate attachment of one or more other components thereto, such as stator brackets 179. For example, as shown aft spar 143 defines a plurality of apertures 159 that extend through plate 145. Apertures 159 may be configured, for example, to receive fasteners to secure stator brackets 179 to aft spar 143.

Figure 6A:
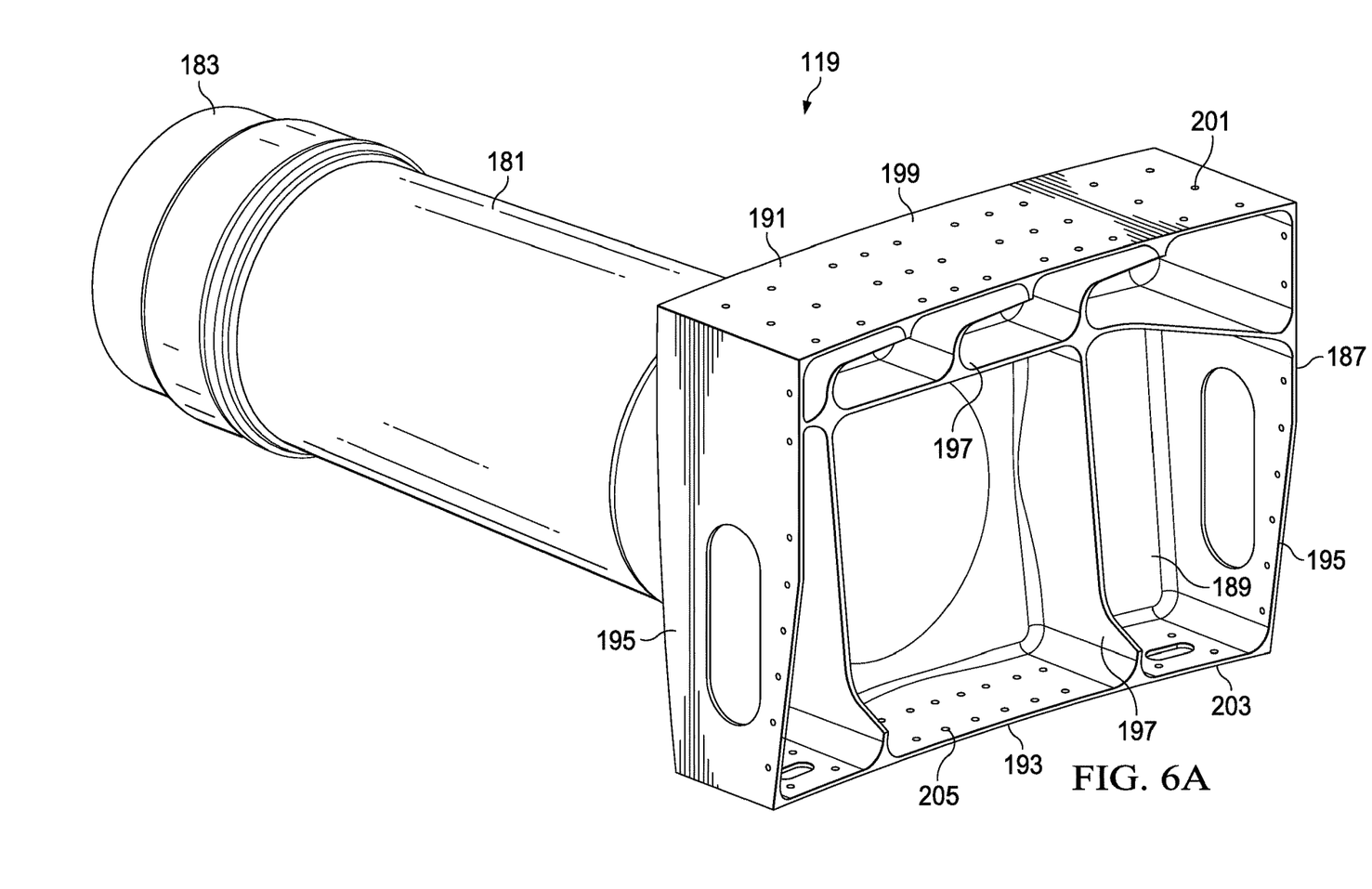
FIG. 6A is an oblique view of a spindle of the duct depicted in FIG. 3.
Figure 6B:
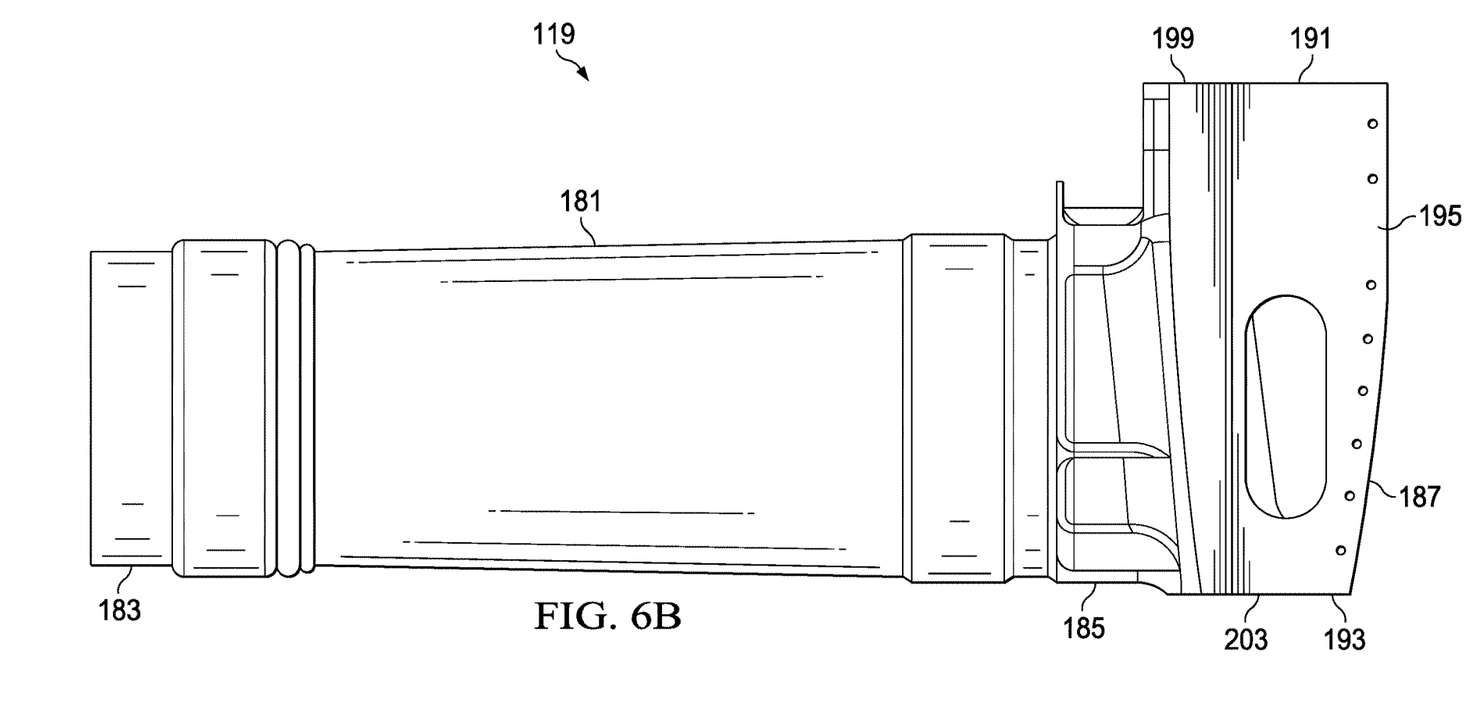
FIG. 6B is a side view of the spindle depicted in FIG. 6A.
Figure 6C:
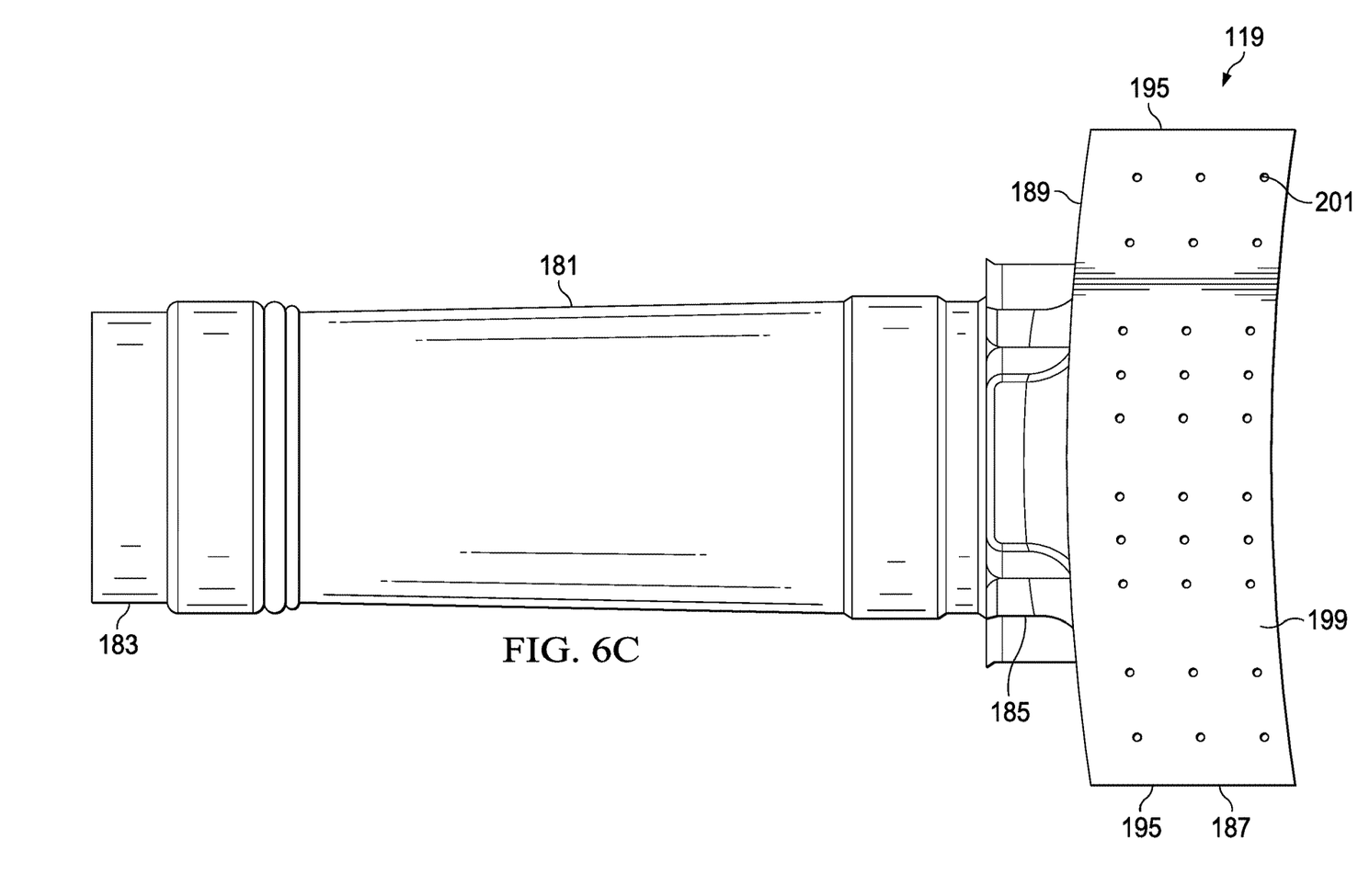
FIG. 6C is a top view of the spindle depicted in FIG. 6A.

FIGS. 6A-6C depict various views of spindle 119. Spindle 119 includes a shaft 181 that extends from a first end 183 to an opposed second end 185. The first end 183 of spindle 119 is configured to be rotatably supported by fuselage 103 of aircraft 101. As shown, shaft 181 of spindle 119 is cylindrical, and tapers between first end 183 and second end 185. It should be appreciated however, that shaft 181 is not limited to the illustrated cylindrical and tapered geometry, and that shaft 181 may be alternatively implemented with any other suitable geometry. Spindle 119 may be fabricated from steel or any other suitable material.

Spindle 119 may be configured to allow attachment of one or more other structural members of duct 107 thereto. In this embodiment, spindle 119 further includes an attachment interface 187 disposed at second end 185 of shaft 181. In this embodiment, attachment interface 187 includes a rear wall 189 that is attached to second end 185 of shaft 181, and further includes an upper wall 191, a lower wall 193 that is spaced from upper wall 191, and opposed side walls 195 that extend from upper wall 191 to lower wall 193. Upper wall 191, lower wall 193, and side walls 195 are sized such that attachment interface 187 defines a rectangular cross-section, taken perpendicular to a longitudinal axis of shaft 181, that is larger than the cross-sectional area of shaft 181 at second end 185. Attachment interface 187 further includes a plurality of cross members 197 that extend between and interconnect rear wall 189, upper wall 191, lower wall 193, and side walls 195. Cross members 197 are configured to provide structural support to attachment interface 187.

Figure 7:
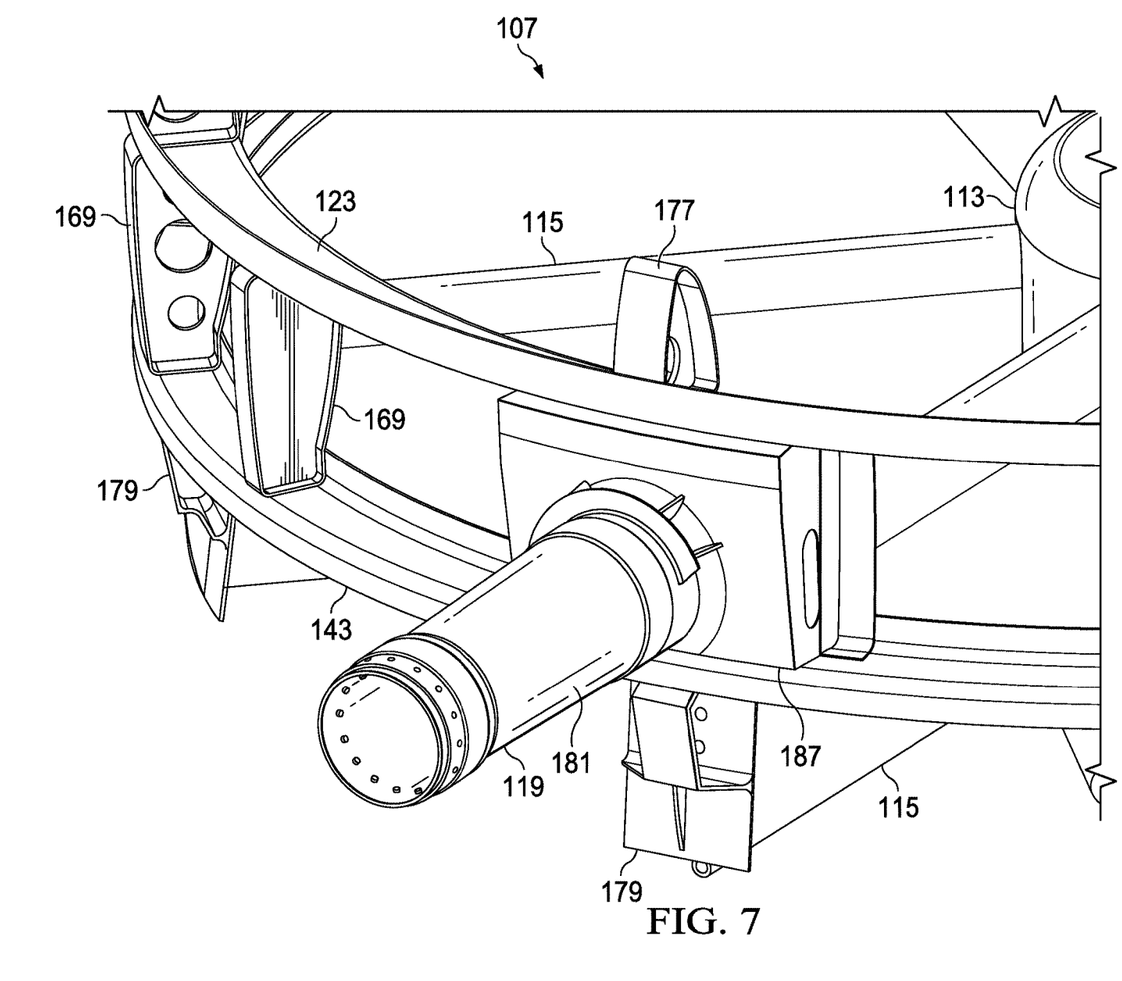
FIG. 7 is an oblique view of a portion of the duct depicted in FIG. 3.
Figure 8:
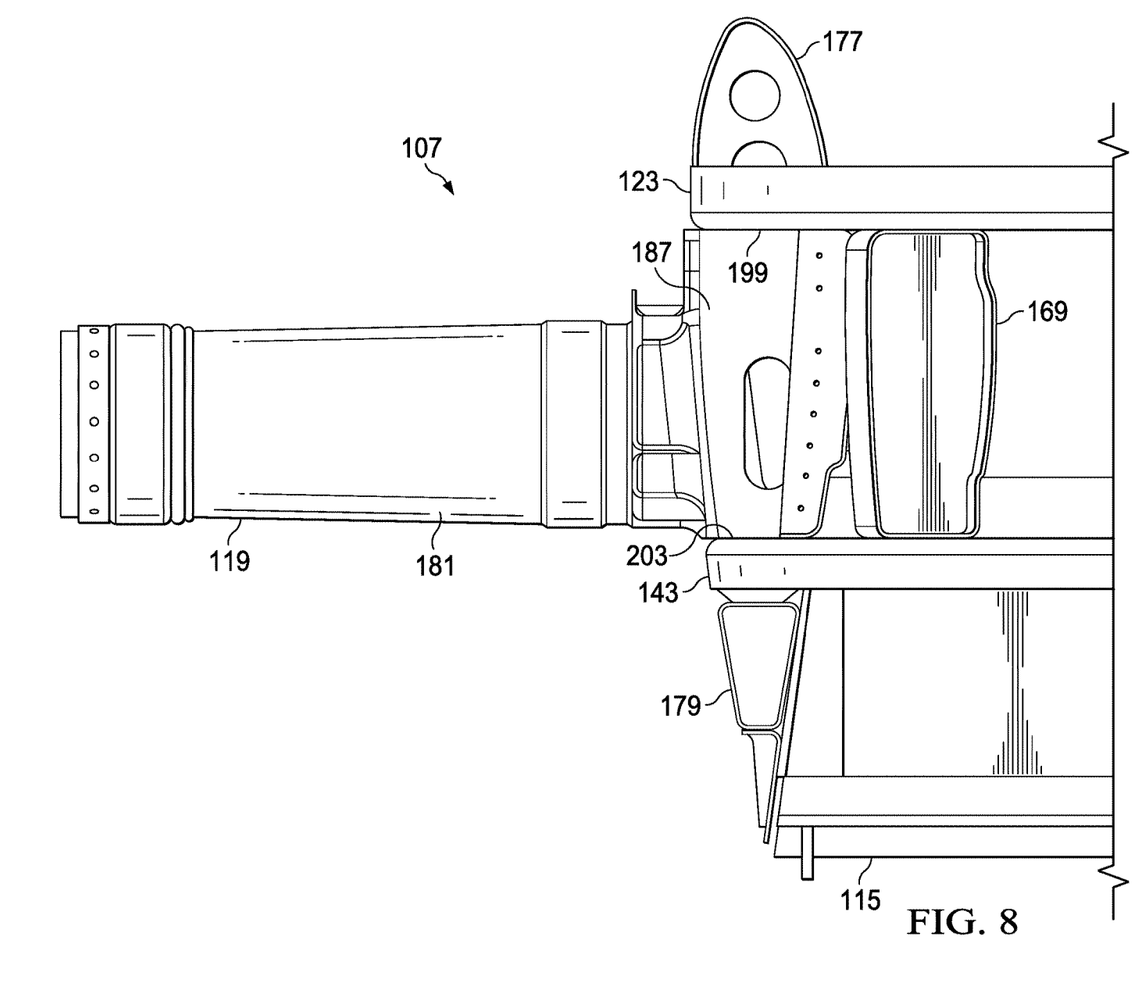
FIG. 8 is a side view of a portion of the duct depicted in FIG. 3.
Figure 9A:
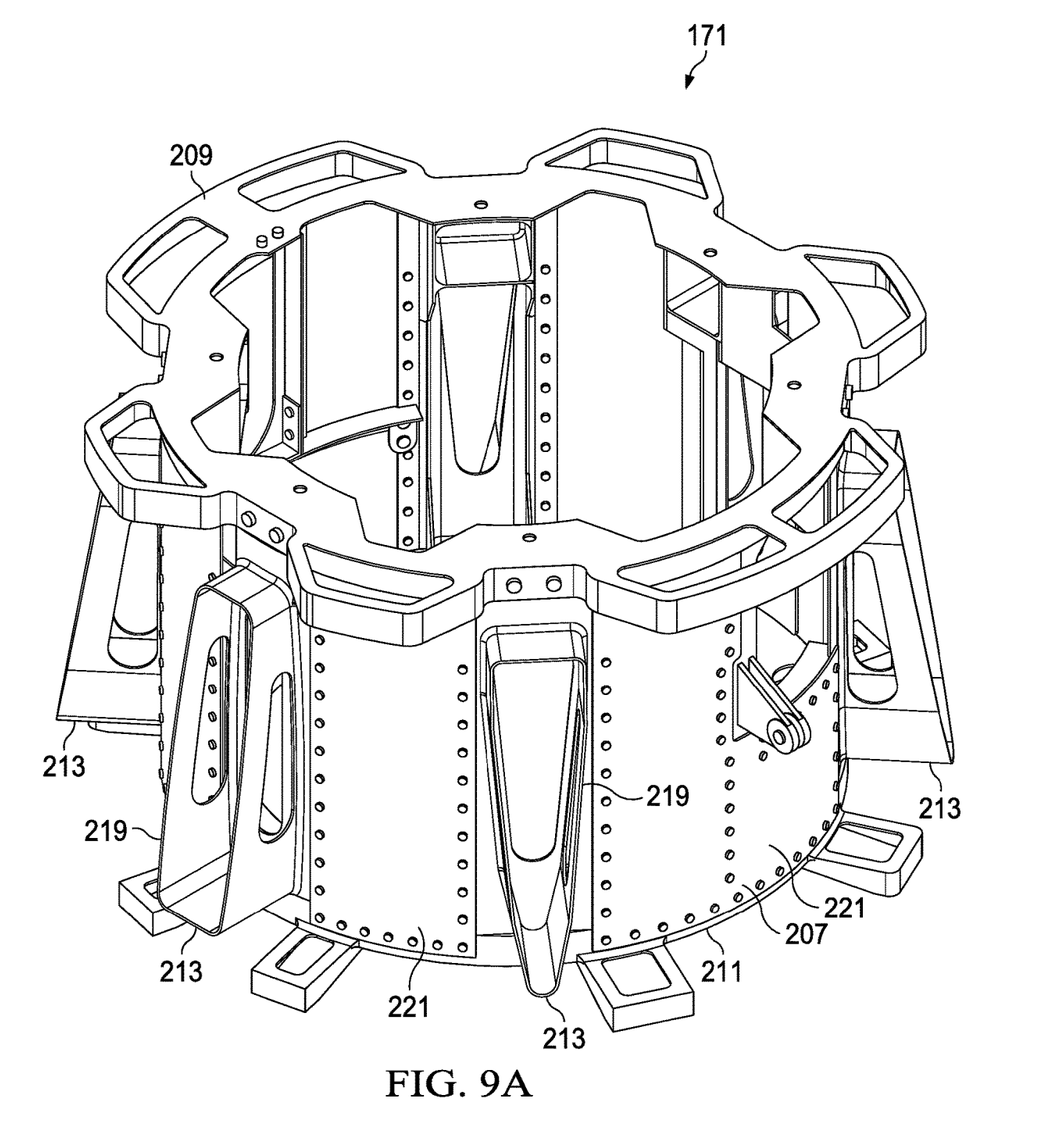
FIGS. 9A and 9B are oblique views of a hub assembly component of the duct depicted in FIG. 3.
Figure 9B:
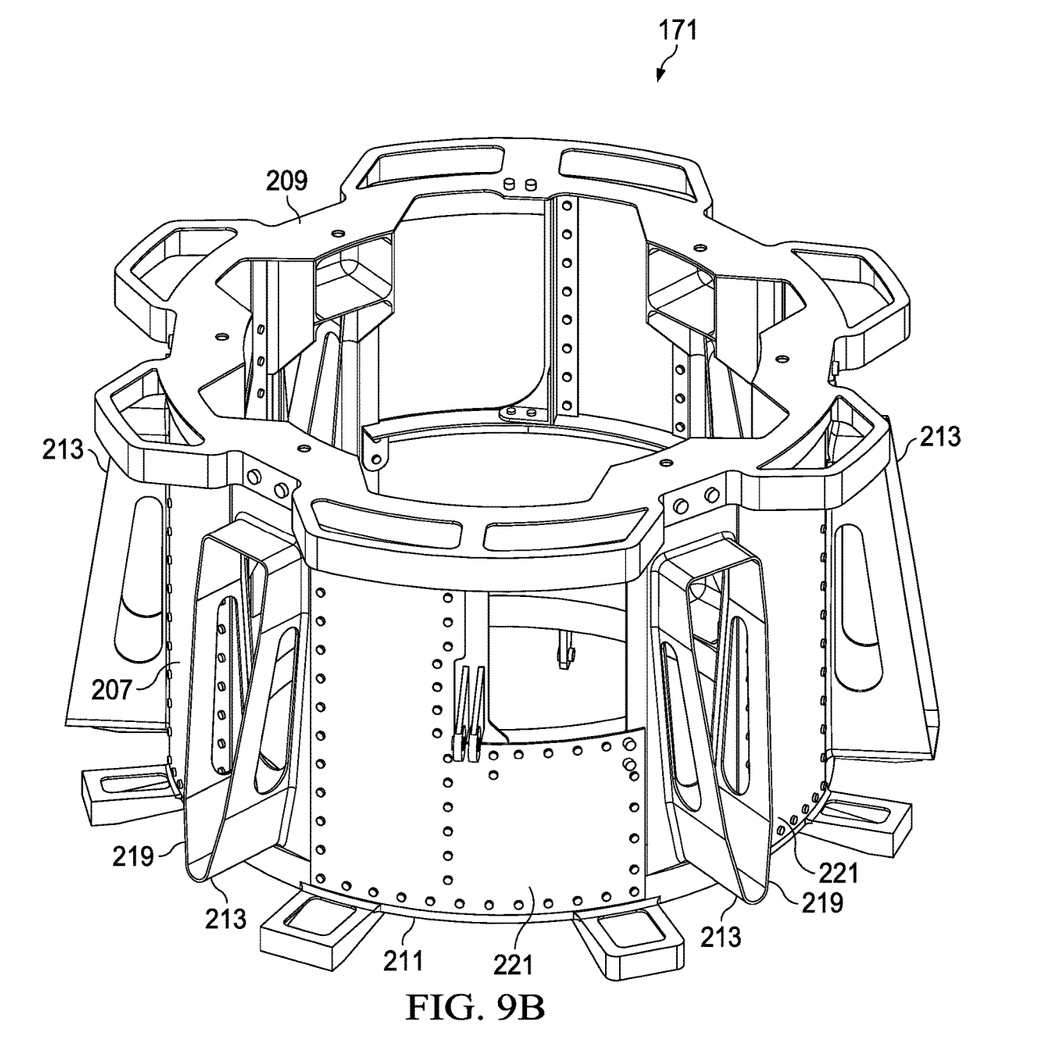
Figure 9C:
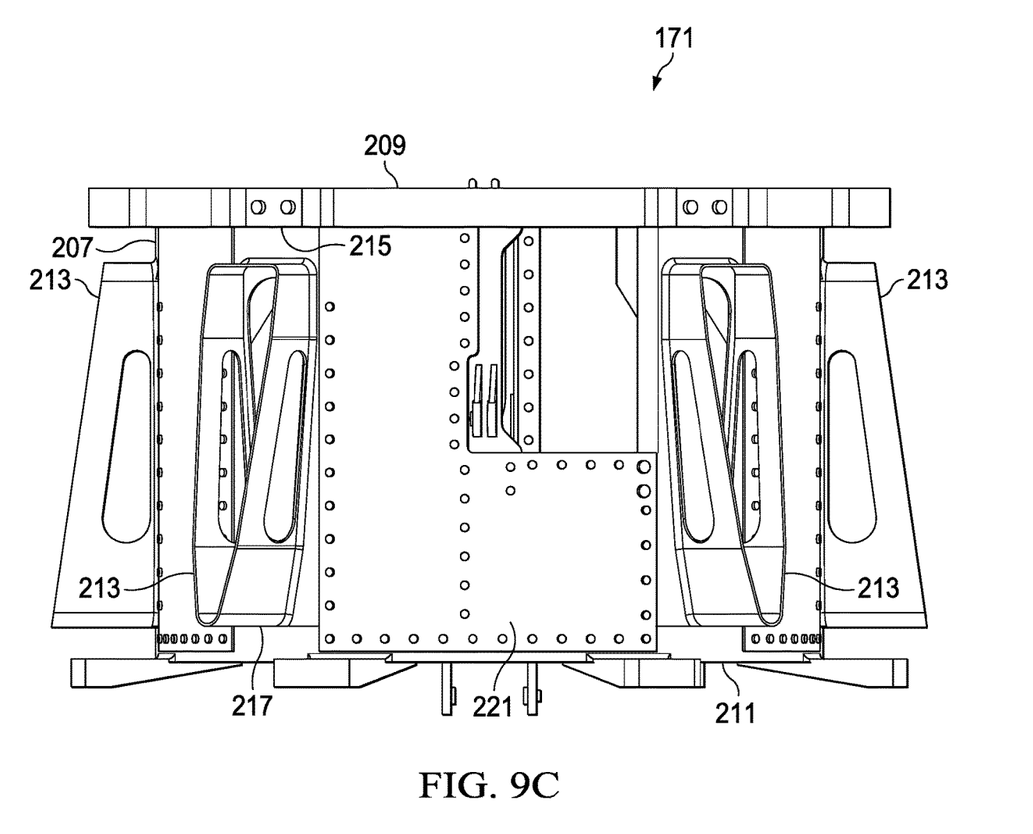
FIGS. 9C and 9D are side views of the hub assembly depicted in FIGS. 9A and 9B.
Figure 9D:
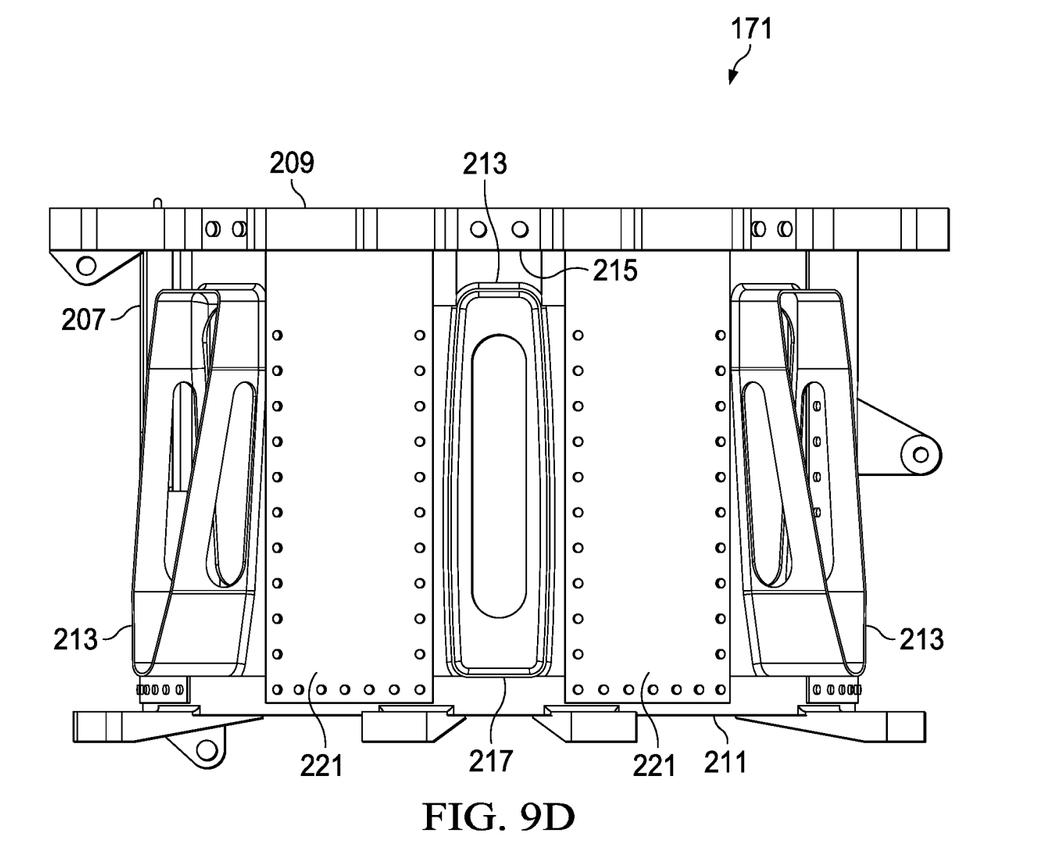

In this embodiment, attachment interface 187 is configured to facilitate attachment of forward spar 123 and aft spar 143 to spindle 119. Upper wall 191 and lower wall 193 are arc-shaped to conform to respective portions of the geometries of forward spar 123 and aft spar 143, respectively. Upper wall 191 defines a planar outer surface 199 that is configured to abut a corresponding portion of lower surface 129 of plate 125 of forward spar 123. Upper wall 191 further defines a plurality of apertures 201 that extend therethrough and that are configured to receive fasteners (e.g., bolts, rivets, or the like) to attach forward spar 123 to attachment interface 187, and thus to spindle 119, as shown in FIGS. 7-8. Lower wall 193 defines a planar outer surface 203 that is configured to abut a corresponding portion of upper surface 147 of plate 145 of aft spar 143. Lower wall 193 further defines a plurality of apertures 205 that extend therethrough and that are configured to receive fasteners (e.g., bolts, rivets, or the like) to attach aft spar 143 to attachment interface 187, and thus to spindle 119, as shown in FIGS. 7-8. Outer surface 199 of upper wall 191 is spaced from outer surface 203 of lower wall 193 through a distance that is the same as that of the spacing between respective outer surfaces of upper ends 173 and lower ends 175 of ribs 169, such that forward spar 123 is spaced uniformly from aft spar 143 about their respective circumferences when forward spar 123 and aft spar 143 are attached to spindle 119.

It should be appreciated that spindle 119 is not limited to the configuration of attachment interface 187 as illustrated and described herein. For example, upper wall 191 and lower wall 193 are not limited to the illustrated planar, arc-shaped geometry, and may be alternatively configured with other suitable geometries to facilitate attachment of forward and aft spars 123, 143, respectively, to spindle 119. Furthermore, attachment interface 187 may be alternatively configured to facilitate attachment of one or more other components of duct 107, in addition to or in lieu of one or both of forward spar 123 and aft spar 143, to spindle 119. Additionally, spindle 119 may be alternatively configured to define two or more discrete attachment interfaces that facilitate attachment of respective components of duct 107 thereto.

FIGS. 9A-9D illustrate various views of hub assembly 171. Hub assembly 171 includes a core 207, a first fitting 209 disposed at an upper end of core 207, and a second fitting 211 disposed at an opposed lower end of core 207. First fitting 209 is configured both to locate an installed position of a motor (not shown) of duct 107 relative to first fitting 209 and to facilitate fixed attachment of the motor to first fitting 209, such that first fitting 209 at least partially supports the motor within hub assembly 171. Second fitting 211 is configured to facilitate attachment of the motor to second fitting 211, such that second fitting 211 at least partially supports the motor within hub assembly 171. First and second fittings 209, 211, respectively, may be fabricated from steel or any other suitable material.

As shown, core 207 includes six stator supports 213. Each stator support 213 is configured to support and facilitate attachment of a corresponding stator 115 to hub 113. Each stator support 213 defines a first end 215, an opposed second end 217, and an insert 219 that is configured to be received in an end of a corresponding stator 115. Each stator 115, once disposed onto a corresponding insert 219, may be attached to insert 219 and thus to hub assembly 171, for example using fasteners. First end 215 of each stator support 213 is configured to facilitate attachment to first fitting 209. Second end 217 of each stator support 213 is configured to facilitate attachment to second fitting 211. In this embodiment, each stator support 213 is fabricated as a single-piece component. With hub assembly 171 in an assembled configuration, each stator support 213 may define a direct load path from the motor of duct 107 to a corresponding stator 115.

As shown, not all stator supports 213 define inserts 219 having the same geometry. For example, stators 115 may have any combination of the same or different cross-sectional profiles, and stator supports 213 may accordingly define inserts 219 having respective geometries that are the same or different relative to one another. Stator supports 213 may be fabricated from steel or any other suitable material.

Core 207 further includes a plurality of wall portions 221 that extend between sides of adjacent stator supports 213. Wall portions 221 are attached to stator supports 213, and may further be attached to one or both of first fitting 209 and second fitting 211. As shown, wall portions 221 comprise arc-shaped plates, such that core 207, when assembled, is substantially cylindrical in shape. It should be appreciated, however, that one or more components of core 207, such as stator supports 213 and/or wall portions 221, may be alternatively configured such that core 207 exhibits a shape other than cylindrical when assembled. It should further be appreciated that duct 107 may be alternatively configured with more or fewer stators 115 such that core 207 may include more or fewer stator supports 213 and more or fewer corresponding wall portions 221.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A duct for a ducted-rotor aircraft, the duct comprising:
   a spindle that extends from a first end that is supported by a fuselage of the aircraft to a second end;
   a first annular spar that is attached to the second end of the spindle;
   a second annular spar that is attached to the second end of the spindle such that the second spar is spaced from the first spar;
   a central hub that supports a motor of the aircraft; and
   a plurality of stators that extend from the central hub to the second spar;
   wherein the spindle includes an attachment interface to which the first and second spars are attached and wherein the attachment interface is disposed axially between the first annular spar and the second annular spar.

2. The duct of claim 1, wherein the attachment interface is disposed at the second end.

3. The duct of claim 2, wherein the attachment interface comprises a first planar surface to which the first spar is attached, and a second planar surface that is spaced from the first planar surface and to which the second spar is attached.

4. The duct of claim 3, wherein the first and second planar surfaces are arc shaped.

5. The duct of claim 1, further comprising:
   a plurality of ribs,
   wherein each of the plurality of ribs defines a first end that is attached to the first spar and an opposed second end that is attached to the second spar.

6. The duct of claim 1, further comprising:
a plurality of stator brackets, each stator bracket configured to facilitate attachment of a first end of a corresponding one of the plurality of stators to the second spar.

7. The duct of claim 1, wherein the central hub comprises a plurality of stator supports, each stator support configured to facilitate attachment of a second end of a corresponding one of the plurality of stators to the central hub.

8. The duct of claim 1, wherein the plurality of stators are unequally spaced around the central hub.

9. The duct of claim 1, wherein the first and second spars are fabricated from composite material.

10. The duct of claim 1, wherein the spindle includes a cylindrical shaft that extends from the first end to the second end.

* * * * *